UNITED STATES PATENT OFFICE.

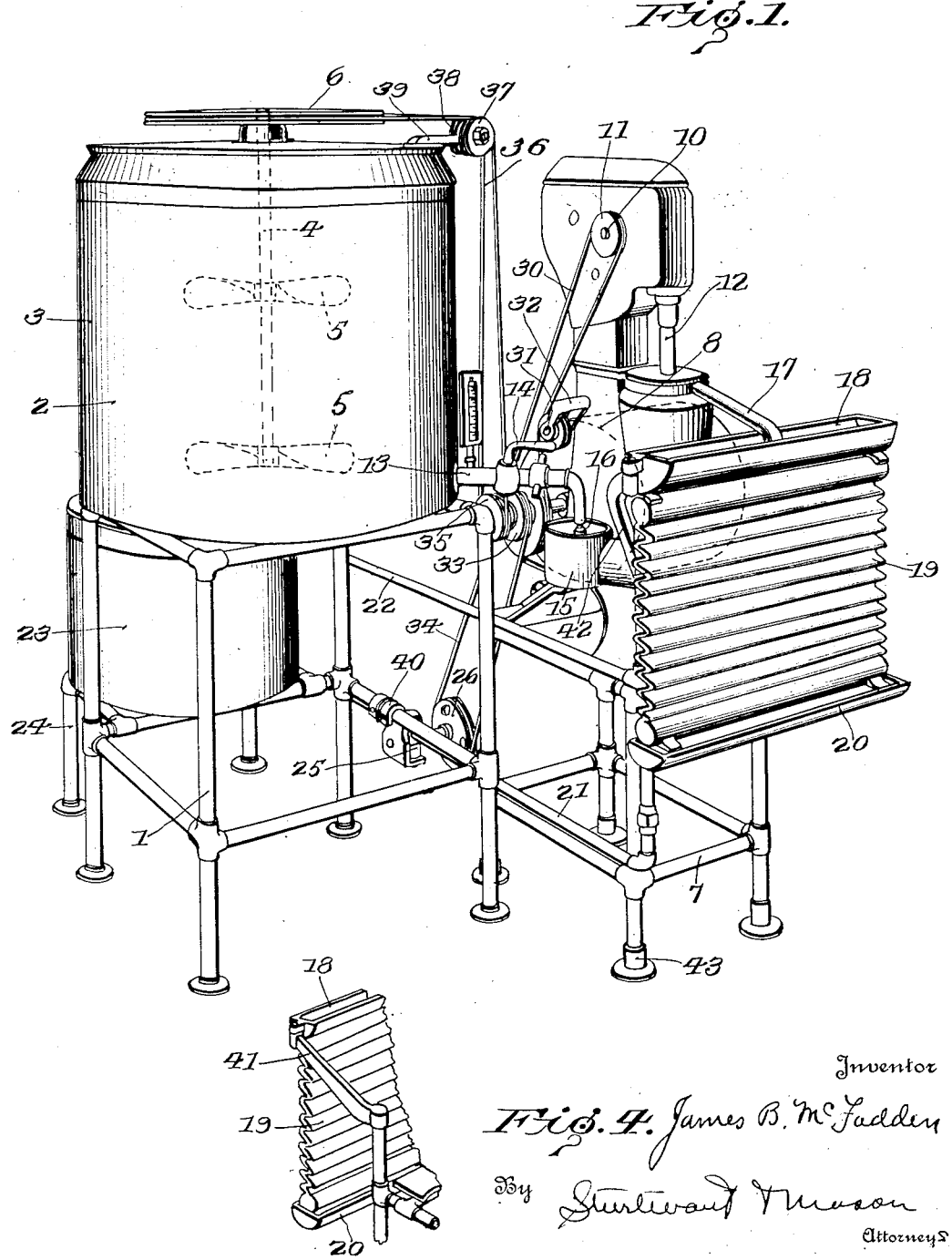

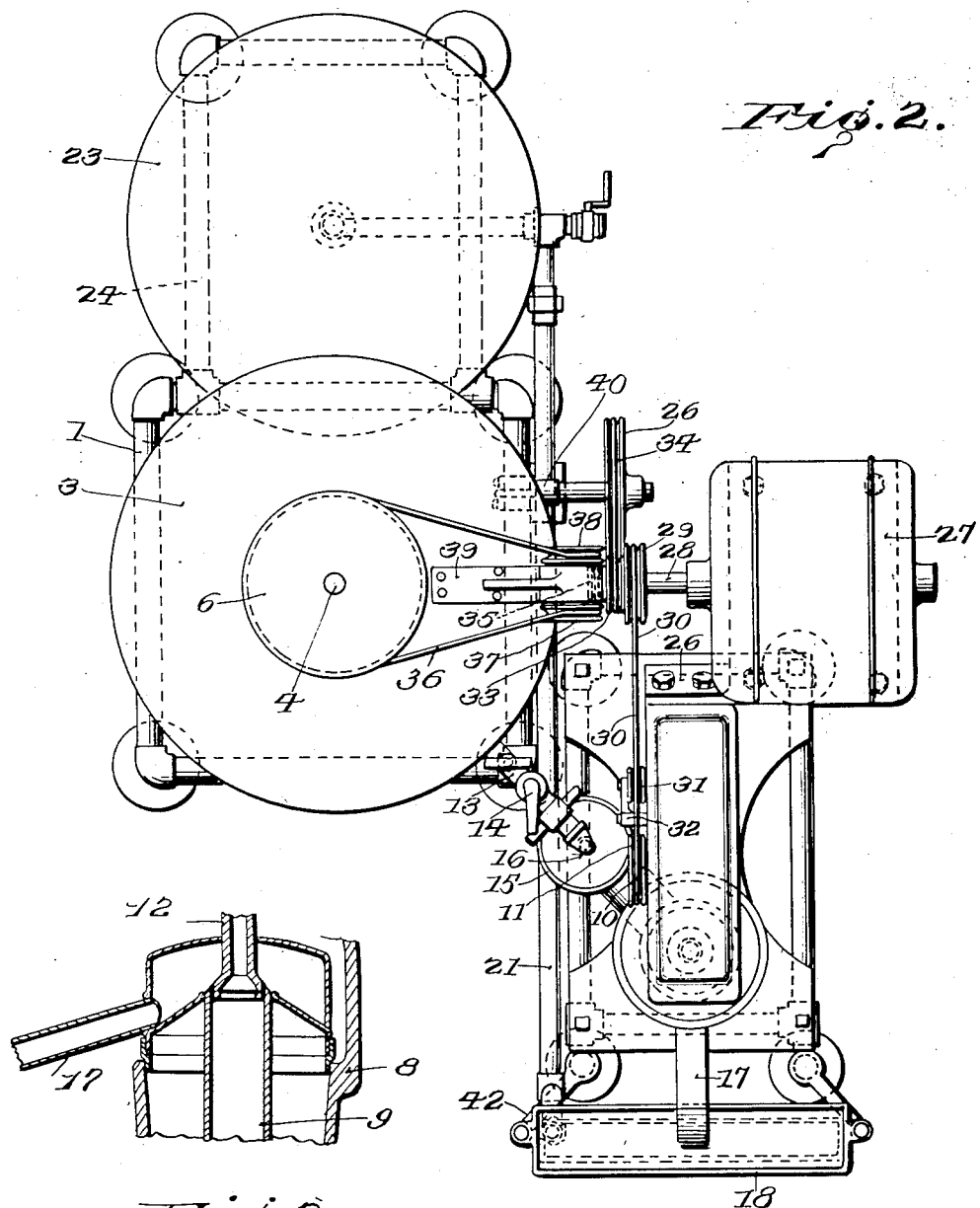

JAMES B. McFADDEN, OF WEST CHESTER, PENNSYLVANIA, ASSIGNOR TO THE SHARPLES SEPARATOR CO., OF WEST CHESTER, PENNSYLVANIA, A CORPORATION OF PENNSYLVANIA.

APPARATUS FOR PRODUCING EMULSIONS.

1,396,376.  Specification of Letters Patent.  Patented Nov. 8, 1921.

Application filed August 9, 1920. Serial No. 402,268.

*To all whom it may concern:*

Be it known that I, JAMES B. McFADDEN, a citizen of the United States, residing at West Chester, in the county of Chester, State of Pennsylvania, have invented certain new and useful Improvements in Apparatus for Producing Emulsions, of which the following is a description, reference being had to the accompanying drawing and to the figures of reference marked thereon.

The invention relates to new and useful improvements in an apparatus for forming emulsions or the like, and has for an object to provide a unitary apparatus wherein all the moving parts of the associated devices are driven from a single shaft mounted in bearings forming a part of the unitary structure.

A further object of the invention is to provide an apparatus of the above type consisting of a mixer having stirring means therein, and an emulsifier having a rotating bowl for emulsifying the mixed ingredients, and a cooling element for chilling the emulsion wherein brine is circulated through said cooling element from a brine tank by a circulating pump, and wherein said stirring means, said rotating bowl and said pump are all driven from a single shaft mounted in bearings forming a unitary part of the frame structure on which the several devices are mounted.

These and other objects will in part be obvious and will in part be hereinafter more fully disclosed.

In the drawings:—

Figure 1 is a perspective view, certain parts being in section, of an apparatus embodying my improvements;

Fig. 2 is a plan view of the same;

Fig. 3 is a detail in section showing a portion of the emulsifier;

Fig. 4 is a detail in perspective showing one of the supporting brackets for the cooling elements.

The invention is directed broadly to a unitary apparatus for forming emulsions. The apparatus consists of a mixing tank in which the materials may be mixed and heated for dissolving the same; an emulsifier in which the dissolved ingredients are emulsified, and a cooler wherein the emulsion is chilled. The mixing tank is provided with rotating stirring means to aid in the quick dissolution of the ingredients. The emulsifier includes a rotating bowl, and the cooling element is cooled by circulating brine which is caused to circulate through said cooling element by means of a rotating pump. The rotating pump, the rotating stirring means and the rotating bowl are all driven from suitable connections with a single shaft mounted in bearings preferably carried by the frame of the emulsifier. As shown in the drawings, this shaft is the rotating shaft of a motor.

Referring more in detail to the drawings, I have shown my apparatus as consisting of a main supporting frame 1 formed of pipe sections. Mounted on this supporting frame 1 is a mixing tank 2 having inner and outer walls forming a heating chamber 3 in which water at the desired temperature may be held. Also mounted in said tank is a vertical rotating shaft 4 carrying blades 5 for mixing the ingredients placed in the tank to aid in the dissolving of the same. The shaft 4 is driven by a belt wheel 6.

Adjacent the main frame 1 is a second frame 7 also formed of pipe sections, and on this frame 7 is mounted an emulsifier 8 which consists of a suitable frame structure in which is mounted to rotate a vertically arranged cylindrical bowl 9. Said bowl is driven by suitable gears from a shaft 10 carrying a belt wheel 11. The spindle of the bowl is indicated at 12. This emulsifier *per se* forms no part of the present invention, and from certain aspects of the invention other forms of emulsifiers may be used.

The material is drawn from the tank through a pipe 13 having a hand valve 14 therein. Said pipe delivers the material to a receptacle 15 which is connected with a suitable receptacle at the bottom of the emulsifier, and a float valve 16 engaging the end of the delivery pipe 13 regulates the flow of the material into the receptacle 15 and thereby the level of the liquid in this receptacle 15. The material is drawn by suction into the emulsifier and escapes at the upper end of the bowl, is collected and delivered through the pipe 17 into a trough 18 at the upper end of the cooling element 19. Said cooling element consists of a corrugated hollow metal structure through which brine is circulated. The emulsion delivered into the trough 18 runs down over the outside of the cooling element and is collected in the trough 20 at the bottom thereof, from which it is delivered to suitable receptacles.

Brine is circulated through the cooling element 19 by means of pipes 21 and 22. These pipes are connected to a brine tank 23 which is mounted on an extension 24 of the main frame 1. The pipe 21 connects with a rotary pump 25 which is actuated by a belt wheel 26, and this pump in turn connects with the brine tank. Brine is pumped through these pipes 21 and 22 to the cooling element 19.

Mounted on a bracket 26' attached to the main frame of the emulsifier 8 is a motor 27. The shaft 28 of the motor is extended and is provided with a belt wheel 29 over which a belt 30 runs, said belt 30 also running over the wheel 11. An idler 31 carried by the bracket 32 engages this belt 30 and places the same under tension. Also carried by the shaft 28 is a second belt wheel 33 over which a belt 34 runs. This belt 34 also runs over the pulley 26 and drives the rotary pump. Mounted on the end of the shaft 28 is a third belt pulley 35 over which a belt 36 runs. This belt runs over pulleys 37 and 38 carried by a bracket 39 and also the pulley 6 and serves as a means to drive the shaft 4 carrying the stirring blades.

The pump 25 is carried by a bracket 40 which is rigidly secured to the frame 1. The cooling element 19 is carried by bracket arms 41 and 42 which are rigidly connected to the frame 7. The pipe 21 is connected to the cooling element, and the cooling element is rigidly connected to the frame 7. This pipe 21 is connected to the pump, and the pump is rigidly carried by the bracket 40 connected to the frame 1, and thus the frames 1 and 7 are secured together forming a unitary structure whereby the several devices are held in proper relation to each other. The frame 7 is provided with adjustable supporting bases 43 so that the frame on which the emulsifier and motor are supported may be properly fitted to any unevenness in the floor.

It is obvious that minor changes in the arrangement of the parts may be made without departing from the spirit of the invention as set forth in the appended claim.

Having thus described the invention, what is claimed as new is:—

An apparatus for forming emulsions comprising a support, a mixer thereon, an emulsifier mounted on said support and having its inlet arranged below and receiving the discharge from the mixer, means for automatically controlling the flow from said mixer to said emulsifier, a cooler mounted on said support with its inlet arranged below and receiving the discharge from the emulsifier, a brine tank and pump mounted on said support and connected to said cooler, a motor on said support, and driving connections from said motor to said pump, mixer and emulsifier whereby agitated liquid automatically flows, without the use of a pump, from said mixer upwardly through said emulsifier into the top of the cooler.

In testimony whereof, I affix my signature.

JAMES B. McFADDEN.